United States Patent
Rix et al.

(12) 
(10) Patent No.: US 6,385,317 B1
(45) Date of Patent: May 7, 2002

(54) METHOD FOR PROVIDING A SECURE COMMUNICATION BETWEEN TWO DEVICES AND APPLICATION OF THIS METHOD

(76) Inventors: Simon Paul Ashley Rix, 51 Ixia Road, Primrose Hill, Germiston, Transvaal (ZA); Andrew Glasspool, Telford Point, Telford Road, Basingstoke, RG21 2XZ; Donald Watts Davies, 15 Hawkewood Road, Sunbury-on-Thames, Middlesex TW16 6HL, both of (GB)

( * ) Notice: Subject to any disclaimer, the term of this patent is extended or adjusted under 35 U.S.C. 154(b) by 0 days.

(21) Appl. No.: 09/155,782
(22) PCT Filed: Mar. 21, 1997
(86) PCT No.: PCT/EP97/01557
   § 371 Date: Apr. 2, 1999
   § 102(e) Date: Apr. 2, 1999
(87) PCT Pub. No.: WO97/38530
   PCT Pub. Date: Oct. 16, 1997

(30) Foreign Application Priority Data

Apr. 3, 1996 (EP) .......................... 96200907

(51) Int. Cl.[7] .............................................. H04H 9/00
(52) U.S. Cl. ................. 380/258; 380/200; 380/205; 380/259; 380/277; 380/110; 713/150; 713/159; 713/168; 713/170; 713/185
(58) Field of Search ................. 380/280, 205, 380/258, 259, 277, 110; 713/150, 159, 168, 170, 185

(56) References Cited

U.S. PATENT DOCUMENTS

| | | | |
|---|---|---|---|
| 4,238,853 A | * 12/1980 | Ehrsam et al. | 375/2 |
| 4,531,020 A | 7/1985 | Wechselberger et al. | 178/22.08 |
| 4,868,877 A | 9/1989 | Fischer | 380/25 |
| 4,887,296 A | 12/1989 | Horne | 380/21 |
| 5,029,207 A | 7/1991 | Gammie | 380/10 |
| 5,048,085 A | * 9/1991 | Abraham et al. | 380/23 |
| 5,054,064 A | 10/1991 | Walker et al. | 380/5 |
| 5,111,504 A | 5/1992 | Esserman et al. | |
| 5,159,633 A | 10/1992 | Nakamura | 380/30 |
| 5,237,610 A | 8/1993 | Gammie et al. | 380/10 |
| 5,282,249 A | 1/1994 | Cohen et al. | 380/23 |
| 5,420,866 A | 5/1995 | Wasilewski | 370/110.1 |
| 5,600,378 A | 2/1997 | Wasilewski | 348/468 |
| 5,625,693 A | 4/1997 | Rohatgi et al. | 380/23 |
| 5,742,677 A | 4/1998 | Pinder et al. | 380/4 |
| 5,870,474 A | 2/1999 | Wasilewski et al. | 380/21 |
| 6,038,321 A | * 3/2000 | Torigai et al. | 380/268 |

FOREIGN PATENT DOCUMENTS

| | | | |
|---|---|---|---|
| EP | 0 428 252 A2 | 5/1991 | H04N/7/167 |
| EP | 0 658 054 A2 | 6/1995 | H04N/7/16 |
| EP | 0 689 316 A2 | 12/1995 | H04L/9/32 |

OTHER PUBLICATIONS

Francoise Coutrot et al., "A Single Conditional Access System for Satellite–Cable and Terrestrial TV", *IEEE Transactions on Consumer Electronics*, vol. 35, No. 3, (Aug. 1989).

(List continued on next page.)

*Primary Examiner*—Phung M. Chung
*Assistant Examiner*—Todd Jack

(57) ABSTRACT

In a method for providing a secure communication between two devices, a first device generates a random key (Ci) and transfers this key to a second device in a first message encrypted using a public key. The second device decrypts the first encrypted message by means of a corresponding secret key to obtain the random key (Ci) and this random key is used to encrypt and decrypt all transmissions between these devices. In a decoder for a pay TV system, comprising a conditional access module and a smart card, this method is applied to provide a secure communication between the control access module and the smart card and/or between the decoder and the conditional access module.

15 Claims, 2 Drawing Sheets

OTHER PUBLICATIONS

A copy of PCT International Search Report mailed on Jul. 4, 1997 (3 pages).

EBU Project Group B/CA, "Functional Model of a Conditional Access System", *EBU Technical Review*, No. 266, pp. 64–77, (Winter 1995).

Andy Trott, "An Enhanced Cost Effective Line Shuffle Scrambling System with Secure Conditional Access Authorization", *NCTA Technical Papers*, pp. 133–143, (Jun. 6, 1993).

Davies, DW and Price, WL, "Issues in the Design of a key Distribution Centre", *National Physical Laboratory*, Apr. 1981, pp. 1–22, ISSN 0143-7348, Teddington, Middlesex TW11 OLW UK.

Lennon, R.E., Matyas, S.M., Meyer, C.H., "Crytopgraphic key Distribution for Terminal Communications", *IBM Technical Disclosure Bulletin*, Jul. 1979, pp. 636–639, vol. 22, No. 2.

"Functional model of a conditional access system", *EBU Project Group B/CA*, Winter 1995, pp. 64–77, XP 000559450.

Notice of Opposition to European Patent No. 0 891 670.

"Protocol Building Blocks", *Introduction to Protocols*, Chapter 2, No Date Given, pp. 21–46.

"Basic Protocols", *Key Exchange*, Chapter 3, No Date Given, pp. 47–74.

Merkle, Ralph C., "Protocols for Public Key Cryptosystems", *ELXSI International*, 1980, p. 122–134, Sunnyvale, California.

\* cited by examiner

METHOD FOR PROVIDING A SECURE COMMUNICATION BETWEEN TWO DEVICES AND APPLICATION OF THIS METHOD

The present application claims the benefit of PCT patent application PCT/EP97/01557, which has a filing date of Mar. 21, 1997 and European patent application 96200907.2, which has a filing date of Apr. 3, 1996.

The present invention relates to a method for providing a secure communication between two devices, in particular between devices used in a pay TV system.

In a pay TV system each subscriber generally has a decoder for descrambling the source component signal, wherein said decoder comprises a conditional access module and a smart card for decrypting entitlement control messages and entitlement management messages. In order to prevent unauthorized operation of the decoder for descrambling a source component signal it is important to prevent switching between an authorized and an unauthorized smart card for example.

The invention aims to provide a method of the above-mentioned type wherein the communication between two devices, such as the control access module and the smart card or the decoder and the conditional access module, is arranged in such a manner that switching between authorized and unauthorized devices is not possible.

According to the invention a method is provided, wherein a first device generates a random key (Ci) and transfers said key to a second device in a first message encrypted using a public key, wherein said second device decrypts the first encrypted message by means of a corresponding secret key to obtain said random key (Ci), wherein said random key is used to encrypt and decrypt further transmissions between said devices.

According to the invention this method can be applied in a decoder for a pay TV system, wherein said decoder comprises a conditional access module and a smart card, wherein said method is applied to provide a secure communication between the control access module and the smart card or between the decoder and the conditional access module.

The invention further provides a decoder for a pay TV system, comprising a conditional access module and a smart card, said conditional access module comprising means for generating a random key (Ci), means for encrypting said key in a first encrypted message using a public key encryption method, means for transfering said first encrypted message to the smart card, said smart card comprising means for receiving and decrypting said first encrypted message to obtain said random key, means for encrypting transmissions to the conditional access module under said random key, said conditional access module having means to decrypt said transmissions received from the smart card.

In a further embodiment of the invention, said decoder comprises a conditional access module and a smart card, wherein said decoder comprises means for generating a random key (Ci), means for encrypting said key in a first encrypted message using a public key encryption method, means for transfering said first encrypted message to the conditional access module, said conditional access module comprising means for receiving and decrypting said first encrypted message to obtain said random key, means for encrypting transmissions to the decoder under said random key, said decoder having means to decrypt said transmissions received from the conditional access module.

The invention will be further explained by reference to the drawings in which an embodiment of the method of the invention is explained as applied in a decoder for a pay TV system.

Figure 1:
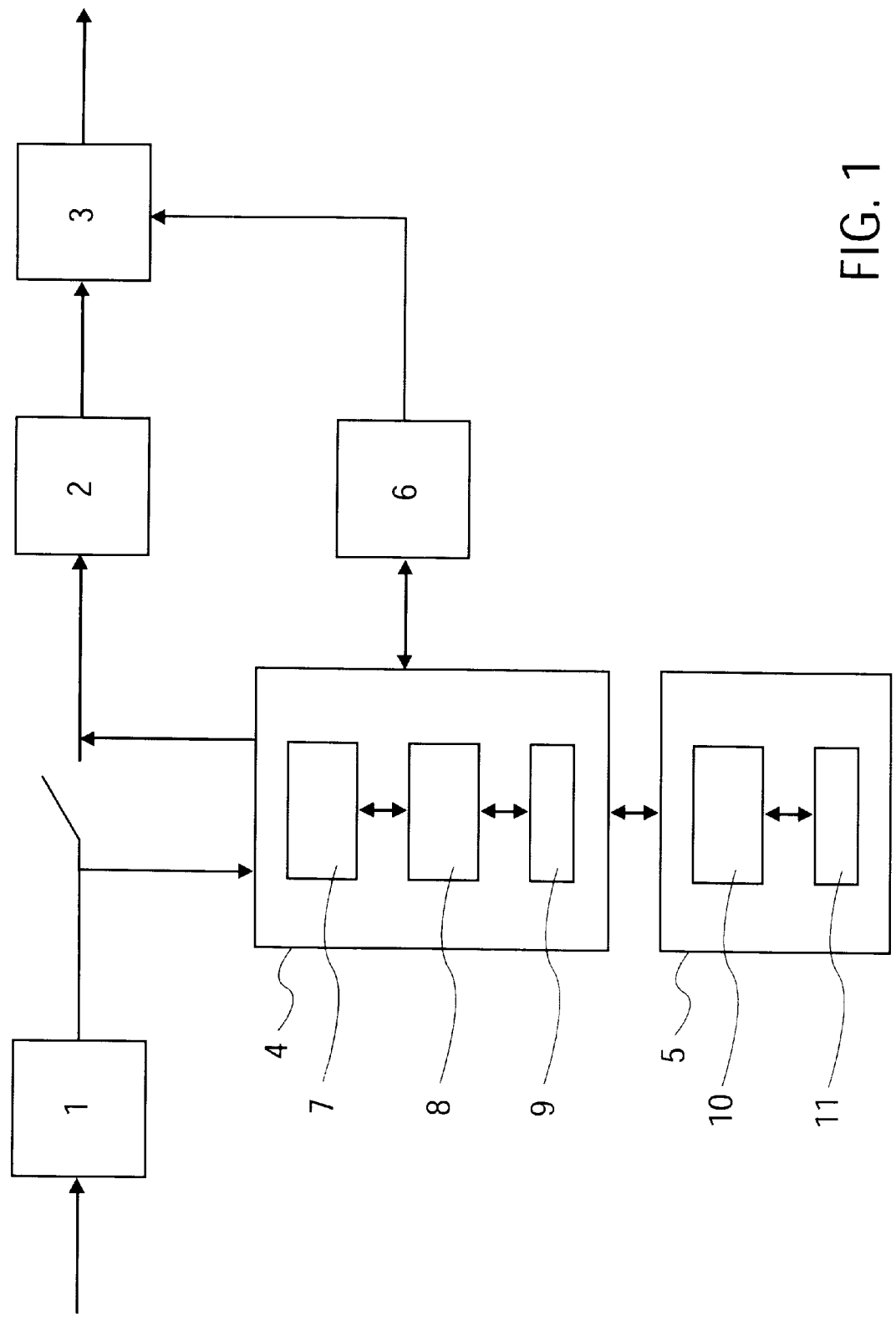
FIG. 1 shows a block diagram of an embodiment of the decoder according to the present invention.

Referring to FIG. 1 there is shown in a very schematical manner a block diagram of a decoder for a pay TV system, wherein digital information signals are scrambled using a control word in accordance with the Eurocrypt standard for example. In this embodiment the decoder comprises a demodulator 1, a demultiplexer 2 and a decompression unit 3. The decoder further comprises a conditional access module or CAM 4 and a smart card 5 which can be inserted into a connection slot of the conditional access module 4. Further the decoder is provided with a microprocessor 6 for configuration and control purposes.

The conditional access module 4 is provided with a descrambler unit 7 and a microprocessor 8 having a memory 9. The smart card 5 comprises a microprocessor 10 having a memory 11.

As the operation of the above-mentioned parts of the decoder is not a part of the present invention, this operation will not be described in detail. Typically, the signal received by the demodulator 1 is a modulated data stream between 950 MHz and 2050 MHz. The output of the demodulator 1 is a scrambled digital data stream which is provided to the CAM 4 and the descrambler 7 will be allowed to descramble this scrambled data stream assuming that an authorized smart card has been inserted and the subscriber is entitled to receive the program. The descrambled data stream is demultiplexed by the demultiplexer 2 and decompressed and converted into the original analogue audio and video signal by the decompression unit 3.

In a pay TV system the control word required for descrambling, is transferred to the subscribers in so-called entitlement control messages containing the control word encrypted using a service key. This service key is downloaded in the memory 11 of the smart card 5 by means of a so-called entitlement management message for example. During operation the CAM 4 transfers the entitlement control messages towards the microprocessor 10 of the smart card 5 so that the microprocessor 10 can process the entitlement control message and extract the control word. Thereafter the smart card 5 returns the decrypted control word towards the CAM 4 so that the descrambler 7 is allowed to descramble the digital data stream received from the demodulator 1.

Figure 2:
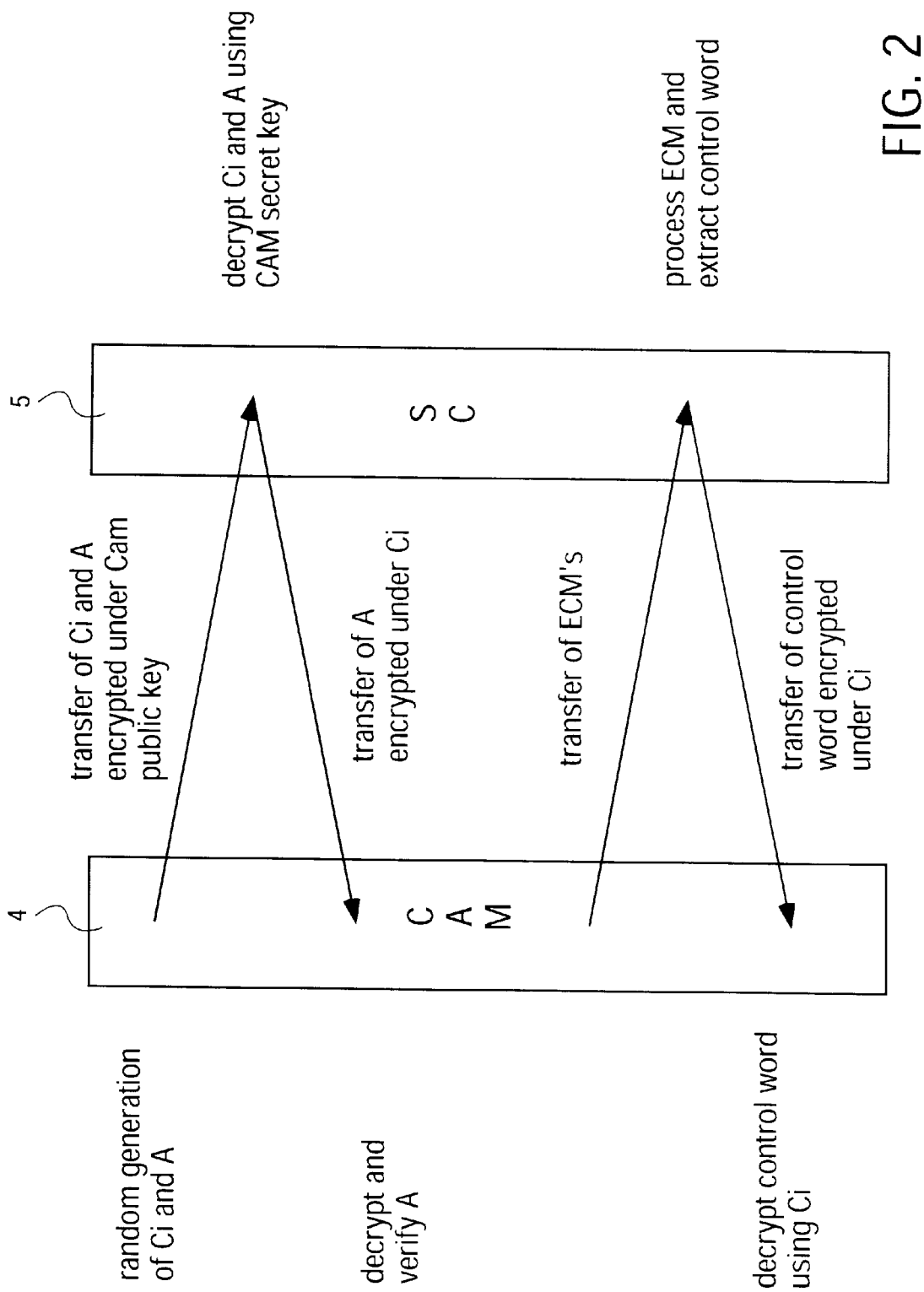
FIG. 2 shows a sequence of steps of an embodiment of the method of the invention.

In order to prevent the use of an unauthorized smart card 5 in combination with the CAM 4 it is important to provide a secure communication between the CAM 4 and the smart card 5. According to the present invention the following method is used to provide such a secure communication. The steps of this method are shown in FIG. 2. When a smart card is inserted into the decoder, the microprocessor 8 of the CAM 4 will generate two random numbers Ci and A. The microprocessor 8 will encrypt in a first message the random numbers Ci and A under a public key of the CAM 4. The thus obtained first message is transferred to the smart card 5 and the microprocessor 10 will decrypt this first message using the secret key of the CAM 4. Thereafter the microprocessor 10 will return a second message to the CAM 4, said second message being the random number A encrypted under the number Ci used as encryption key. The microprocessor 8 of the CAM 4 decrypts this second message and verifies whether the random number A is correct. Assuming that the random number A is indeed correct, so that it may be assumed that the inserted smart card 5 is an authorized smart card, the CAM 4 will then forward entitlement control messages containing the encrypted control word to the smart card 5 which will process the entitlement control message and extract the control word in a conventional manner. However, in the return message towards the CAM 4, the smart card will forward the extracted control word encrypted under the key Ci and these encrypted control words are decrypted by the microprocessor 8 using the same key Ci. As soon as one tries to replace the inserted smart card 5 by an other smart card, for example by switching from the authorized smart card 5 to an unauthorized smart card, the CAM 4 will immediately establish such change as the key Ci will not be known to the new smart card, so that the CAM will no longer be able to descramble the return messages containing the control word. Thereby the descrambler unit 7 will be disabled.

The method described can be used in the same manner for providing a secure communication between the CAM 4 and the decoder, wherein the same protocol as shown in FIG. 2 is followed.

In summary it will be understood that if a new CAM 4 is connected to the other decoder parts, the microprocessor 6 of the decoder will generate the two random numbers Ci and A and as soon as the microprocessor 6 has decrypted the second message received from the microprocessor 8 of the CAM 4, and has verified that the random number A is correct, the key Ci will be used in all transmissions between the CAM 4 and the microprocessor 6.

The invention is not restricted to the above-described embodiments which can be varied in a number of ways within the scope of the claims. As an example for a further embodiment the CAM (i.e. the descrambler) may be part of the decoder. The decoder would now challenge the smart card to authenticate itself to obtain a secure communication between the smart card and the decoder.

What is claimed is:

1. A method for providing a secure communication between two devices in a decoder for a pay TV system, wherein said decoder comprises a conditional access module (CAM) and a smart card (SC), wherein a first device generates a random key (Ci) and transfers said key to a second device in a first message encrypted using a public key, wherein said second device decrypts the first encrypted message by means of a corresponding secret key to obtain said random key of a corresponding secret key to obtain said random key (Ci), wherein after decrypting said encrypted message, said second device first returns said random key (Ci) in a second encrypted message with an authentication to said first device, wherein said random key (Ci) is used to encrypt and decrypt transmissions from said second to said first device.

2. The method according to claim 1, wherein for providing said authentication said first device further generates a random number (A) and transfers this random number (A) together with said random key (Ci) in said first encrypted message to the second device, wherein the second device uses said random number (A) for authentication in the second encrypted message.

3. The method according to claim 2, wherein said second device encrypts said random number (A) under said random key (Ci) to obtain said second encrypted message.

4. The method of claim 1, wherein said method provides a secure communication between the conditional access module and the smart card.

5. The method of claim 1, wherein said method provides a secure communication between the decoder and the conditional access module.

6. The method of claim 2, wherein said method provides a secure communication between the conditional access module and the smart card.

7. The method of claim 3, wherein said method provides a secure communication between the conditional access module and the smart card.

8. The method of claim 2, wherein said method provides a secure communication between the decoder and the conditional access module.

9. The method of claim 2, wherein said method provides a secure communication between the decoder and the conditional access module.

10. A decoder for a pay TV system, comprising a conditional access module and a smart card, said conditional access module comprising means for generating a random key (Ci), means for encrypting said key in a first encrypted message using a public key encryption method, means for transferring said first encrypted message to the smart card, said smart card comprising means for receiving and decrypting said first encrypted message to obtain said random key, means for encrypting transmissions to the conditional access module under said random key, said conditional access module having means to encrypt said transmissions received from the smart card.

11. A decoder according to claim 10, wherein said smart card comprises means for returning said random key to the conditional access module in a second encrypted message with an authentication.

12. A decoder according to claim 11, wherein said generating means of the conditional access module further generates a random number which is included in said first encrypted message, wherein the smart card is adapted to use said random number as authentication in the second encrypted message.

13. A decoder for a pay TV system, comprising a conditional access module and a smart card, wherein said decoder comprises means for generating a random key (Ci), means for encrypting said key in a first encrypted message using a public key encryption method, means for transferring said first encrypted message to the conditional access module, said conditional access module comprising means for receiving and decrypting said first encrypted message to obtain said random key, means for encrypting transmissions to the decoder under said random key, said decoder having means to decrypt said transmissions received from the conditional access module.

14. The decoder according to claim 13, wherein said conditional access module comprises means for returning said random key to the decoder in a second encrypted message with an authentication.

15. The decoder according to claim 14, wherein said generating means of the decoder further generates a random number which is included in said first encrypted message, wherein the conditional access module is adapted to use said random number as authentication in the second encrypted message.

* * * * *

UNITED STATES PATENT AND TRADEMARK OFFICE
CERTIFICATE OF CORRECTION

PATENT NO. : 6,385,317 B1
DATED : May 7, 2002
INVENTOR(S) : Rix et al.

It is certified that error appears in the above-identified patent and that said Letters Patent is hereby corrected as shown below:

<u>Column 4,</u>
Line 13, delete "method of claim 2" and insert -- method of claim 3 --.
Lines 29 and 33, delete "A decoder" and insert -- The decoder --.

Signed and Sealed this

Twenty-fourth Day of December, 2002

JAMES E. ROGAN
*Director of the United States Patent and Trademark Office*

UNITED STATES PATENT AND TRADEMARK OFFICE
CERTIFICATE OF CORRECTION

PATENT NO.     : 6,385,317 B1
DATED          : May 7, 2002
INVENTOR(S)    : Rix et al.

It is certified that error appears in the above-identified patent and that said Letters Patent is hereby corrected as shown below:

<u>Title page,</u>
Insert -- [73] Assignee:  Irdeto Access B.V. --.

Signed and Sealed this

Eighth Day of April, 2003

JAMES E. ROGAN
*Director of the United States Patent and Trademark Office*